United States Patent
Kakutani et al.

(10) Patent No.: US 12,304,022 B2
(45) Date of Patent: May 20, 2025

(54) TOUCHING DETECTION DEVICE

(71) Applicant: DMG MORI CO., LTD., Nara (JP)

(72) Inventors: Masahide Kakutani, Nara (JP); Akio Ishii, Nara (JP)

(73) Assignee: DMG MORI CO., LTD., Nara (JP)

( * ) Notice: Subject to any disclaimer, the term of this patent is extended or adjusted under 35 U.S.C. 154(b) by 1015 days.

(21) Appl. No.: 17/312,750

(22) PCT Filed: Jul. 17, 2019

(86) PCT No.: PCT/JP2019/028041
§ 371 (c)(1),
(2) Date: Jun. 10, 2021

(87) PCT Pub. No.: WO2020/121579
PCT Pub. Date: Jun. 18, 2020

(65) Prior Publication Data
US 2022/0063043 A1     Mar. 3, 2022

(30) Foreign Application Priority Data

Dec. 14, 2018   (JP) ................... 2018-234342

(51) Int. Cl.
*B23Q 17/22*   (2006.01)
(52) U.S. Cl.
CPC ................ *B23Q 17/2241* (2013.01)
(58) Field of Classification Search
CPC ................ B23Q 17/2241; B23Q 17/22
(Continued)

(56) References Cited

U.S. PATENT DOCUMENTS

| 4,443,946 A * | 4/1984 | McMurtry | G01B 7/012 |
| | | | 33/561 |
| 4,941,266 A * | 7/1990 | Bissegger | G01B 5/012 |
| | | | 33/559 |
| 2018/0080767 A1 | 3/2018 | Onoe | |

FOREIGN PATENT DOCUMENTS

| CN | 113739717 A * | 12/2021 | ............ G01B 11/24 |
| JP | S60117107 A | 6/1985 | |

(Continued)

OTHER PUBLICATIONS

Extended European Search Report related to Application No. 19894669.1 reported on Jul. 4, 2022.

(Continued)

*Primary Examiner* — Thomas C Lee
*Assistant Examiner* — Michael Tang
(74) *Attorney, Agent, or Firm* — von Briesen & Roper, s.c.

(57) ABSTRACT

A touching detection device (1) includes: a probe (10) having a touched part (11) with a touch surface (11a, 11b) to be touched by an object to be detected, a support part (13) supporting the touched part (11), and a sensed part (19); a sensor (S) sensing the sensed part (19); and a body (2) holding the probe (10) and the sensor (S). The support part (13) is held by the body (2) to be swingable in a direction in which the object to be detected touches the touch surface (11a, 11b) of the touched part (11). The sensed part (19) is displaced in accordance with the amount of swing of the support part (13). The sensor (S) senses the sensed part (19) and outputs a detection signal when the sensed part (19) is displaced by a preset displacement amount. The support part (13) supports the touched part (11) via an angle adjustment (Continued)

mechanism (15) configured to be able to adjust the angle of the touch surface (11*a*, 11*b*) in the swinging direction of the support part (13).

4 Claims, 11 Drawing Sheets

(58) Field of Classification Search
USPC .......................................................... 700/192
See application file for complete search history.

(56) References Cited

FOREIGN PATENT DOCUMENTS

| JP | S61110109 U | | 7/1986 |
|----|----|----|----|
| JP | H2281102 A | | 11/1990 |
| JP | 2000161901 A | * | 6/2000 |
| JP | 2006038616 A | * | 2/2006 |
| JP | 2016145771 A | | 8/2016 |
| JP | 2018048857 A | | 3/2018 |

OTHER PUBLICATIONS

International Search Report for related Application No. PCT/JP2019/028041; report dated Oct. 10, 2019.

\* cited by examiner

TOUCHING DETECTION DEVICE

TECHNICAL FIELD

The present invention relates to a touching-type detection device (touching detection device) used, for example, in the field of machine tool to set an offset amount in a tool length direction.

BACKGROUND ART

A known example of a touching detection device as mentioned above is disclosed in Patent Literature 1 listed below. This detection device includes a probe to be touched by an object to be detected such as a tool, and a sensor sensing displacement of the probe and outputting a detection signal when the probe is displaced by the object to be touched touching the probe.

The probe has a touch surface (touched part) to be touched by the object to be detected, and consists of a first shaft configured to swing in the touching direction of the object when the object touches the touch surface, and a second shaft connected to the first shaft and configured to be displaced in an axial direction thereof by swing of the first shaft. The sensor is configured to sense displacement of the second shaft in the axial direction of the support shaft and output a detection signal.

In this detection device, if, in order to improve responsiveness of the sensor to displacement of the probe, the sensor is set to sense a very small amount of displacement of the probe, the problem of erroneous detection occurs, e.g., the sensor outputs a detection signal even though the object to be detected does not touch the probe. In particular, in the case where this detection device is installed inside a machine tool, erroneous detection is likely to occur because vibration generated by operation of motion mechanisms of the machine tool and vibration generated in subtractive machining are propagated to the detection device and the probe is displaced due to the vibrations.

Accordingly, in this detection device, to prevent such erroneous detection, an angular area up to the first shaft being tilted to a predetermined angle is designated as a dead zone, and the sensor is configured to sense the second shaft and output a detection signal when the first shaft is tilted by the predetermined angle and the second shaft is displaced in the axial direction thereof in accordance with the tilt angle of the first shaft. The tilt angle of the first shaft as the dead zone and the displacement of the second shaft corresponding to the tilt angle of the first shaft are appropriately set, whereby the occurrence of erroneous detection as described above is prevented.

CITATION LIST

Patent Literature

[Patent Literature 1] Japanese Unexamined Patent Application Publication No. 2018-48857

SUMMARY OF INVENTION

Technical Problem

The detection device disclosed in Patent Literature 1 is improved so as to prevent erroneous detection caused by vibration; however, in terms of operational efficiency and detection accuracy, it is not necessarily able to provide both sufficiently satisfying operational efficiency and detection accuracy, and has some points to be improved.

For example, in the field of machine tool, in setting offset amounts in a tool length direction, a distal end of each setting target tool is pressed against the touched part of the probe by manually operating the machine tool. The reason for this is that, because the amount of protrusion from a tool holder varies widely among the tools, automatic operation using an appropriate NC program does not allow the operation of pressing the distal end of each tool against the touched part of the probe to be performed in an appropriate state which involves no interference.

In view of this background, the operation of pressing the distal end of each tool against the touched part of the probe is performed manually. However, if the touched part has a very small touch surface, the operation of pressing the distal end of each tool against the touch surface has to be performed carefully and finely so as to precisely press the distal end of each tool against the touch surface, which reduces operational efficiency.

A possible solution for improving operational efficiency is to design the touched part to have a large touch surface so as to precisely press the distal end of each tool against the touch surface by rough operation. However, such a large touch surface causes the problem that an error occurs in the tool detection position in the pressing direction. That is to say, if the touched part is designed to have a large touch surface so as to press the distal end of each tool against the touch surface by rough operation, the position of touching of the tool with the touch surface varies widely in a direction perpendicular to the pressing direction, and this variation causes a difference (error) in the position of the tool distal end in the pressing direction at the time when the first shaft is tilted by the predetermined angle. This error causes the problem that the offset amounts in the tool length direction are inaccurately set.

The present invention has been achieved in view of the above-described circumstances, and an object of the present invention is to provide a touching detection device using a swing-type probe which enables the position of the tool distal end in the pressing direction at the time when the sensor outputs a detection signal to be approximately uniform even in the case where the touch surface to be touched by tools is so large enough to bring each tool into contact with the touch surface by rough operation.

Solution to Problem

To solve the above-described problems, the present invention provides a touching detection device including:
  a probe that has a touched part, a support part supporting the touched part, and a sensed part, the touched part having a touch surface to be touched by an object to be detected;
  a sensor that senses the sensed part of the probe; and
  a body that holds the probe and the sensor, wherein:
  the support part is held by the body to be swingable in a direction in which the object to be detected touches the touch surface of the touched part;
  the sensed part is configured to be displaced in accordance with the amount of swing of the support part;
  the sensor is configured to, when the sensed part is displaced by a preset displacement amount, sense the sensed part and output a detection signal; and
  the support part is configured to support the touched part via an angle adjustment mechanism that is able to adjust the angle of the touch surface in the swinging direction of the support part.

With the touching detection device having this configuration (first configuration), an object to be detected is detected in the manner described below. That is to say, an object to be detected is first linearly moved in the swingable direction of the support part so that the object to be detected touches the touch surface of the touched part. Thereby, the support part is swung and the sensed part is displaced in accordance with the amount of swing of the support part. When the support part is swung to a predetermined angle and thereby the sensed part is displaced by a displacement amount corresponding to the swing, the sensed part is sensed by the sensor and the sensor outputs a detection signal.

In this touching detection device, the touched part of is arranged such that the angle of the touch surface in the swinging direction of the support part is adjustable by means of the angle adjustment mechanism. By adjusting the support relation (support angle) between the touched part and the support part by means of the angle adjustment mechanism, the touched part can be set such that, when the support part is swung to the angle at which the sensor outputs the detection signal, the touch surface of the touched part is perpendicular to the touching direction of the object to be detected.

Therefore, even in the case where the touched part is designed to have a large touch surface so as to improve operational efficiency and this causes the position of touching of the object to be detected with the touch surface to vary widely in a direction perpendicular to the direction in which the object to be detected is pressed against the touched part, the position of the object to be detected in the pressed direction when the support part is swung to the angle at which the sensor outputs the detection signal is approximately uniform.

Therefore, using this touching detection device to set tool offset amounts in a machine tool enables accurately calculating the tool offset amounts.

The touching detection device having the first configuration may be configured such that:
the touched part has two touch surfaces to be touched by the object to be detected, the touch surfaces being perpendicular to each other;
the support part is held by the body to be swingable in each of two directions in which the object to be detected touches each of the touch surfaces of the touched part;
the sensed part is configured to be displaced in accordance with the amount of swing of the support part in each of the two directions;
the sensor is configured to, when the sensed part is displaced by a preset displacement amount in accordance with the amount of swing of the support part in each of the two directions, sense the sensed part and output a detection signal; and
the angle adjustment mechanism is configured to be able to adjust the angle of each of the touch surfaces in the corresponding swinging direction of the support part.

With the touching detection device having this configuration (second configuration), an object to be detected is moved in each of the two perpendicular directions so that the object to be detected is pressed against the corresponding touch surface of the touched part. Thereby, the support part is swung in the pressed direction of the object to be detected and the sensed part is displaced in accordance with the amount of swing of the support part. When the support part is swung to a predetermined angle and thereby the sensed part is displaced by a displacement amount corresponding to the swing, the sensed part is sensed by the sensor and the sensor outputs a detection signal.

In this touching detection device having the second configuration, the touched part is arranged such that the angles of the touch surfaces in the two swinging directions of the support part are adjustable by means of the angle adjustment mechanism. By adjusting the support relation (support angle) between the touched part and the support part in the two directions by means of the angle adjustment mechanism, the touched part can be set such that, when the support part is swung, in each of the swinging directions, to the angle at which the sensor outputs the detection signal, the corresponding touch surface of the touched part is perpendicular to the touching direction of the object to be detected.

Therefore, also in this touching detection device having the second configuration, even in the case where the position of touching of the object to be detected with the touch surface varies widely in a direction perpendicular to the direction in which the object to be detected is pressed against the touched part, the position of the object to be detected in the pressed direction when the support part is swung to the angle at which the sensor outputs the detection signal is approximately uniform. Therefore, using this touching detection device to set offset amounts in a tool length direction and tool diameter compensation amounts (hereinafter, collectively referred to as "tool offset amounts") in a machine tool enables accurately calculating the tool offset amounts.

The touching detection device having the first configuration or the second configuration may further include an adjustment jig detachably attached to the body to tilt the support part in the swinging direction or directions. With the touching detection device having this configuration (third configuration), the adjustment of the support relation (support angle) between the touched part and the support part by means of the angle adjustment mechanism is facilitated by tilting the support part in the swinging direction or directions by means of the adjustment jig.

The present invention further provides a touching detection device including:
a probe that has a touched part, a support part integrally coupled to the touched part, and a sensed part, the touched part having a touch surface to be touched by an object to be detected;
a sensor that senses the sensed part of the probe; and
a body that holds the probe and the sensor, wherein:
the support part is held by the body to be swingable in a direction in which the object to be detected touches the touch surface of the touched part;
the sensed part is configured to be displaced in accordance with the amount of swing of the support part;
the sensor is configured to, when the sensed part is displaced by a preset displacement amount, sense the sensed part and output a detection signal; and
the touched part is coupled to the support part such that, when the support part is swung to an angle at which the sensor outputs the detection signal, the touch surface of the touched part is perpendicular to the touching direction of the object to be detected.

In the touching detection device having this configuration (fourth configuration), the touched part is coupled to the support part such that, when the support part is swung to the angle at which the sensor outputs the detection signal, the touch surface of the touched part is perpendicular to the touching direction of the object to be detected. Therefore, this touching detection device achieves the same effect as the touching detection device having the first configuration described above. That is to say, even in the case where the touched part is designed to have a large touch surface so as to improve operational efficiency and this causes the position of touching of the object to be detected with the touch surface to vary widely in a direction perpendicular to the direction in which the object to be detected is pressed against the touched part, the position of the object to be detected in the pressed direction when the support part is swung to the angle at which the sensor outputs the detection signal is approximately uniform. Therefore, using this touching detection device having the fourth configuration to set tool offset amounts in a machine tool enables accurately calculating the tool offset amounts.

The touching detection device having the fourth configuration may be configured such that:

the touched part has two touch surfaces to be touched by the object to be detected, the touch surfaces being perpendicular to each other;

the support part is held by the body to be swingable in each of two directions in which the object to be detected touches each of the touch surfaces of the touched part;

the sensed part is configured to be displaced in accordance with the amount of swing of the support part in each of the two directions;

the sensor is configured to, when the sensed part is displaced by a preset displacement amount in accordance with the amount of swing of the support part in each of the two directions, sense the sensed part and output a detection signal; and the touched part is coupled to the support part such that, when the support part is swung, in each of the swinging directions, to an angle at which the sensor outputs the detection signal, the corresponding touch surface of the touched part is perpendicular to the touching direction of the object to be detected.

In the touching detection device having this configuration (fifth configuration), the touched part is coupled to the support part such that, when the support part is swung, in each of the swinging directions, to the angle at which the sensor outputs the detection signal, the corresponding touch surface of the touched part is perpendicular to the touching direction of the object to be detected. Therefore, this touching detection device achieves the same effect as the touching detection device having the second configuration described above. That is to say, even in the case where the position of touching of the object to be detected with the touch surface varies widely in a direction perpendicular to the direction in which the object to be detected is pressed against the touched part, the position of the object to be detected in the pressed direction when the support part is swung to the angle at which the sensor outputs the detection signal is approximately uniform. Therefore, using this touching detection device to set tool offset amounts in a machine tool enables accurately calculating the tool offset amounts.

Advantageous Effects of Invention

As described above, with the touching detection device according to the present invention having the first configuration or the fourth configuration, even in the case where the touched part is designed to have a large touch surface so as to improve operational efficiency and this causes the position of touching of the object to be detected with the touch surface to vary widely in a direction perpendicular to the direction in which the object to be detected is pressed against the touched part, the position of the object to be detected in the pressed direction when the support part is swung to the angle at which the sensor outputs the detection signal is approximately uniform. Therefore, using this touching detection device to set tool offset amounts in a machine tool enables accurately calculating the tool offset amounts.

Further, also with the touching detection device according to the present invention having the second configuration or the fifth configuration, even in the case where the position of touching of the object to be detected with the touch surface varies widely in a direction perpendicular to the direction in which the object to be detected is pressed against the touched part, the position of the object to be detected in the pressed direction when the support part is swung to the angle at which the sensor outputs the detection signal is approximately uniform. Therefore, using this touching detection device to set tool offset amounts in a machine tool enables accurately calculating the tool offset amounts.

Further, with the touching detection device having the third configuration, the adjustment of the support relation between the touched part and the support part by means of the angle adjustment mechanism in the touching detection device having the first configuration or the second configuration is facilitated by tilting the support part in the swinging direction or directions by means of the adjustment jig.

DESCRIPTION OF EMBODIMENTS

Hereinafter, specific embodiments of the present invention will be described with reference to the drawings.

First Embodiment

Figure 1:
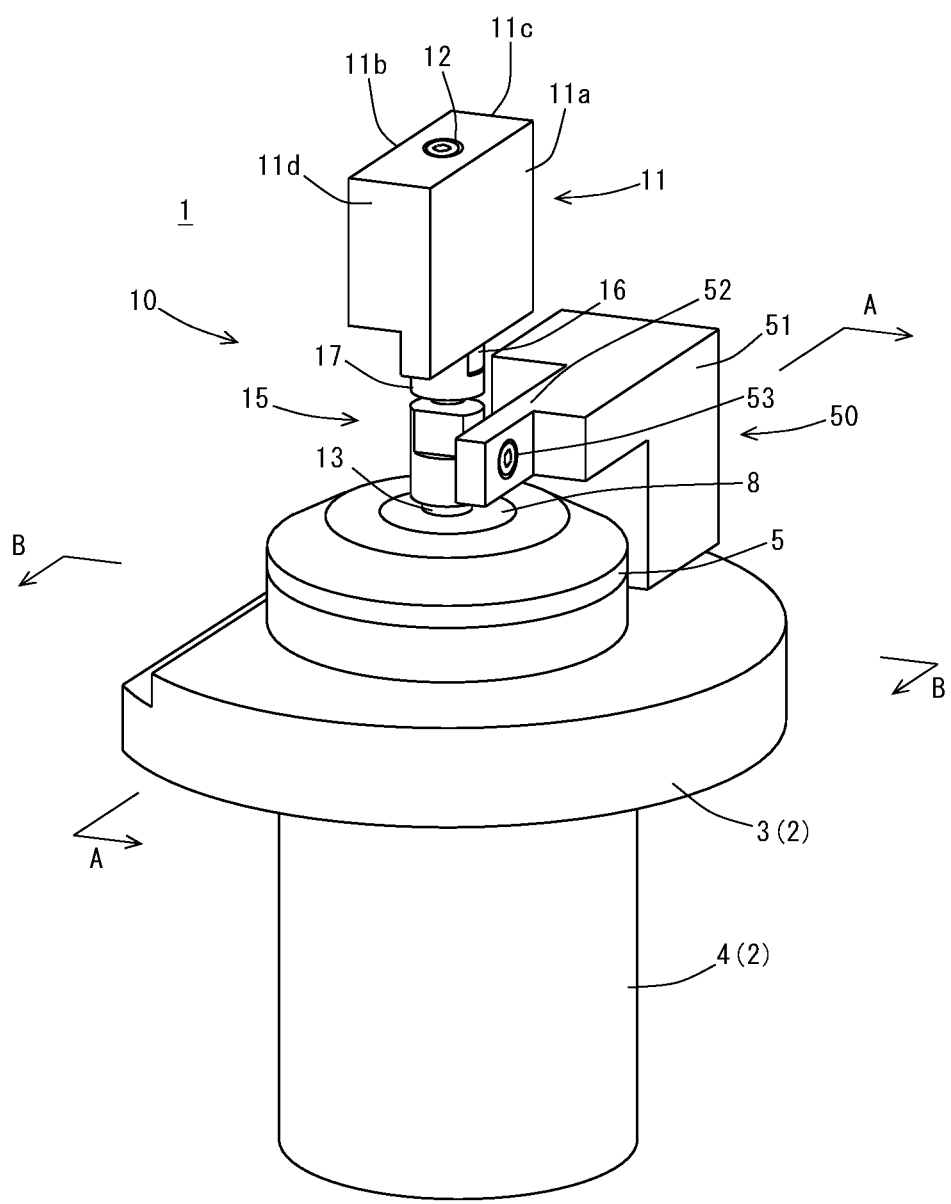
FIG. 1 is a perspective view illustrating a touching detection device according to a first embodiment of the present invention.
Figure 2:
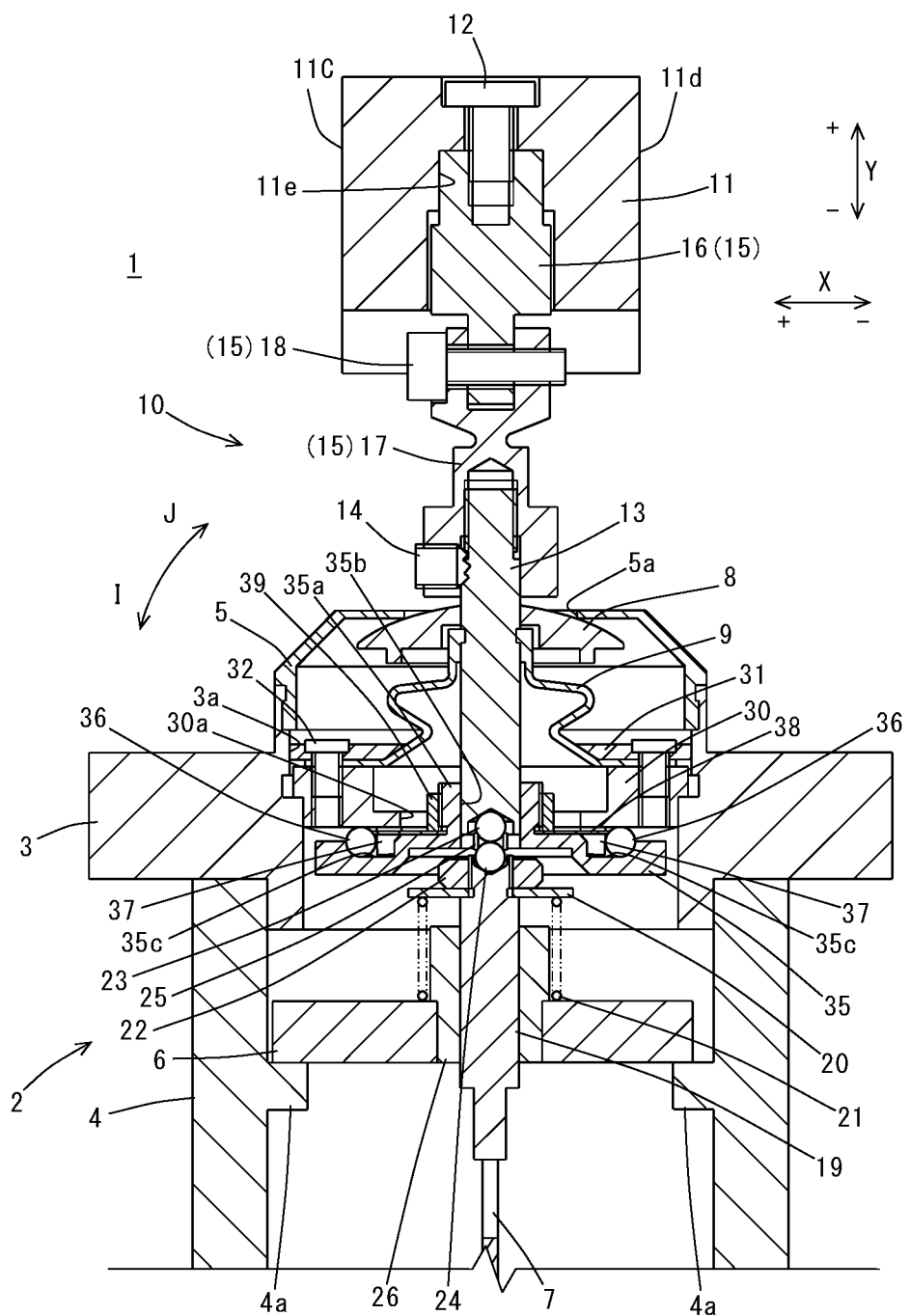
FIG. 2 is a sectional view taken along line A-A in FIG. 1.
Figure 3:
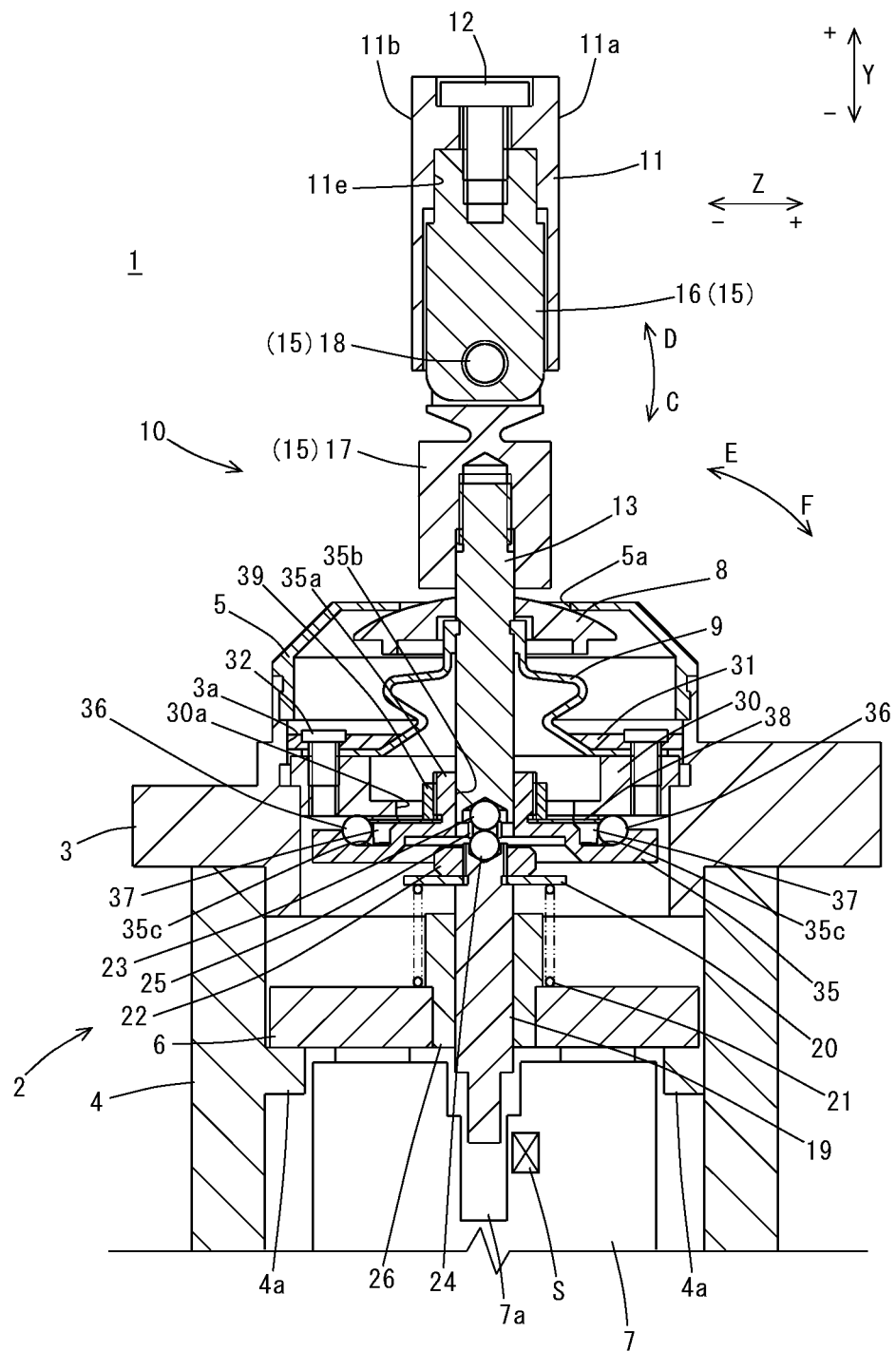
FIG. 3 is a sectional view taken along line B-B in FIG. 1.

First, a touching detection device according to a first embodiment of the present invention is described on the basis of FIGS. 1 to 9.
1. Configuration of Touching Detection Device As illustrated in FIGS. 1 to 3, the touching detection device 1 according to the first embodiment includes a probe 10, a sensor S, a body 2, and an adjustment jig 50. These components are each described in detail below. Note that illustration of the adjustment jig 50 is omitted in FIGS. 2 and 3.

The body 2 consists of an upper body 3 and a lower body 4 coupled to each other vertically, and holds the probe 10 and the sensor S. The upper body 3 is composed of an annular member having openings in upper and lower faces thereof. The lower body 4 is of a bottomed cylindrical shape having an opening in an upper face thereof and is coupled to the lower face of the upper body 3. Further, a lid 5, which is of a cup shape having openings in upper and lower faces thereof, is arranged on the upper opening 3a of the upper body 3.

The probe 10 consists of a touched body 11 as a touched part, a support shaft 13 as a support part, a sensed shaft 19 as a sensed part, and other components. The touched body 11 has touch surfaces 11a, 11b, 11c, and 11d to be touched by an object to be detected (not illustrated) such as a tool. The support shaft 13 supports the touched body 11 via an angle adjustment mechanism 15. The sensed shaft 19 is connected to the support shaft 13.

The touched body 11 is composed of a rectangular parallelepiped member, and the touch surfaces 11a and 11b are formed by a pair of opposed side surfaces of the touched body 11 and the touch surfaces 11c and 11d are formed by another pair of opposed side surfaces of the touched body 11. Further, the touched body 11 has a holding hole 11e formed therein that penetrates vertically.

The angle adjustment mechanism 15 consists of a fork end 17, a joint 16 coupled to the fork end 17, and a bolt 18 for tightening a fork portion of the fork end 17. The joint 16 is inserted in the holding hole 11e of the touched body 11. The joint 16 in this state is fastened to the touched body 11 by tightening of a bolt 12. The fork end 17 has a screw hole formed that has an opening in a lower surface of the fork end 17, in which screw hole one end (a screw portion of an upper end) of the support shaft 13 is screwed. Note that loosening of the support shaft 13 screwed in the fork end 17 is prevented by a set screw 14.

The other end (lower end) of the support shaft 13 is inserted in the lid 5 through an opening 5a of the lid 5 and swingably held by an elastic holding member 9. The holding member 9 is fixed to a fixing member 30 by a bolt 32 via a presser plate 31. Note that the fixing member 30 is of an annular shape having openings in upper and lower faces thereof and is fixed to the upper body 3 inside the upper body 3. Further, a cover 8 is fitted around the support shaft 13 at a position higher than the holding member 9 so that the opening 5a of the lid 5 is closed by the cover 8.

Further, a swinging board 35 is fitted around a lower end portion of the support shaft 13, and the swinging board 35 is fixedly attached to the lower end portion of the support shaft 13 by a suitable method such as shrink fitting. The swinging board 35 is of a circular plate shape and has a boss portion 35a formed on a central portion of an upper surface thereof. The boss portion 35a has a through hole 35b formed therein that penetrates vertically, and has a male screw formed on an outer peripheral surface thereof.

Figure 4:
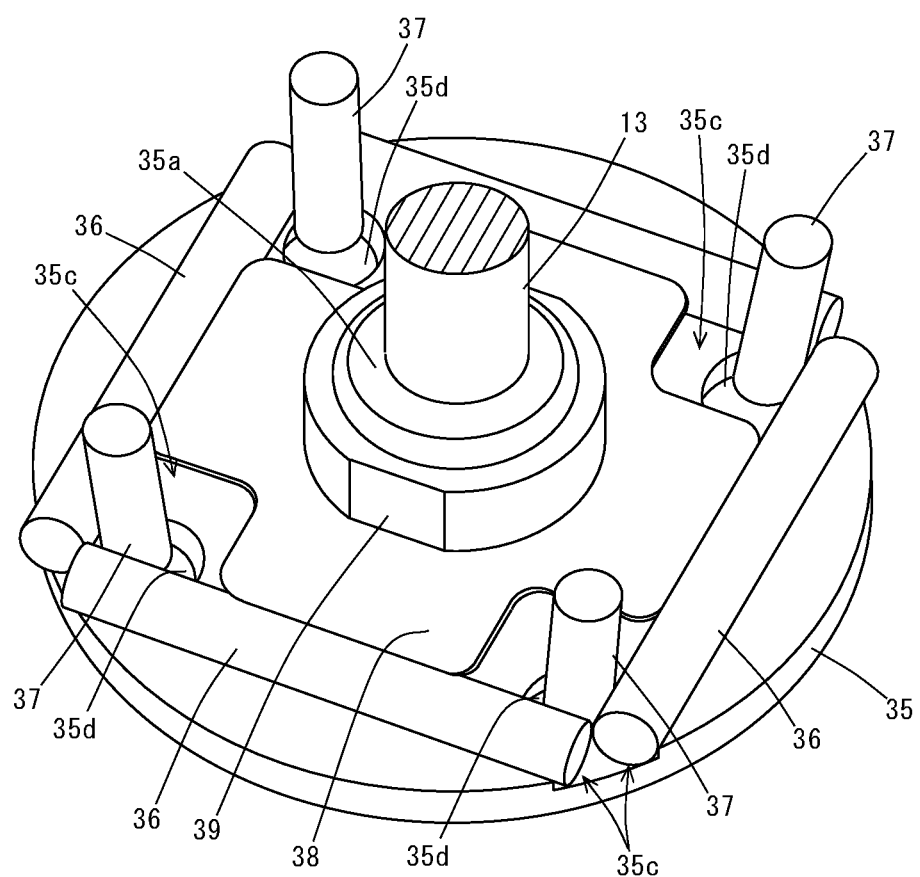
FIG. 4 is a perspective view illustrating a swinging board, a reference pin, a support pin, and other components according to the first embodiment.

As illustrated also in FIG. 4, the swinging board 35 has receiving grooves 35c formed in the upper surface thereof, and the receiving grooves 35c form a quadrangle centered at the boss portion 35a in plan view. Each receiving groove 35 receives a reference pin 36 therein. Further, a presser plate 38 having a cross shape in plan view is fitted around the boss portion 35a. The presser plate 38 is pressed downward by a nut 39 screwed with the boss portion 35a, and each reference pin 36 is pressed against an outer-side inner wall of the corresponding receiving groove 35c by the presser plate 38.

Inside each corner of the quadrangle formed by the four reference pins 36, a support pin 37 is arranged such that it is in contact with the two corresponding reference pins 36. The support pins 37 are implanted in a lower surface of the fixing member 30. The swinging board 35 further has relief holes 35d, which penetrate vertically, bored at positions corresponding to the support pins 37.

The support shaft 13 and the sensed shaft 19 are connected to each other via a pair of spheres 23, 24. The sphere 23 is received by a holding hole formed in a lower end surface of the support shaft 13, while the sphere 24 is received by a holding hole formed in an upper end surface of the sensed shaft 19. The spheres 23 and 24 are supported by a holding ring 25.

The sensed shaft 19 is held by a sleeve 26 to be movable in an axial direction thereof. The sleeve 26 is held by a support ring 6 in a state of being fitted in a center hole of the support ring 6. The support ring 6 is fixedly attached to a flange 4a formed to protrude from an inner peripheral surface of the lower body 4.

Further, a compressed coil spring 21 is fitted around the sleeve 26. The compressed coil spring 21 is compressed downward via a presser plate 20 by tightening of a presser nut 22 screwed with a screw portion of the upper end of the sensed shaft 19. Thereby, the sensed shaft 19 is biased upward by the action of the compressed coil spring 21 so that the pair of spheres 23, 24 is maintained in a state of being in contact with each other. Further, the support shaft 13 and the swinging board 35 are biased upward via the spheres 23 and 24 so that the reference pins 36 are in contact with the lower surface of the fixing member 30.

A support plate 7 is provided on a lower surface of the support ring 6 such that it hangs down from the lower surface of the support ring 6. The support plate 7 has a cut 7a formed to allow the lower end of the sensed shaft 19 to move in the axial direction thereof, and has the sensor S provided thereon. When the lower end of the sensed shaft 19 is displaced downward by a predetermined amount, the sensor S senses the lower end of the sensed shaft 19 and outputs a detection signal.

The adjustment jig 50 is composed of a block-shaped member and is detachably attached on the upper face of the upper body 3. The adjustment jig 50 has an adjustment bolt 53 screwed in an arm portion 52 thereof that extends to the fork end 17 side from a base portion 53b thereof when the adjustment jig 50 is mounted on the upper body 3. The adjustment bolt 53 is screwed in the arm portion 52 at a position facing a shaft portion of the fork end 17 in the mounted state. The adjustment bolt 52 is movable forward and backward in a direction perpendicular to the side surface 11a of the touched body 11.

2. Basic Manner of Touching Detection

Next, a basic manner of touching detection in the touching detection device 1 according to this embodiment is described. Note that the angle of the touched body 11 in a rotation direction about an axis of the joint 16 (the direction indicated by an arrow in FIG. 6) has been adjusted so that the touch surfaces 11a and 11b are parallel to one of the two pairs of parallel-disposed reference pins 36, 36. Accordingly, the touch surfaces 11c and 11d are parallel to the other pair of reference pins 36, 36.

Figure 5:
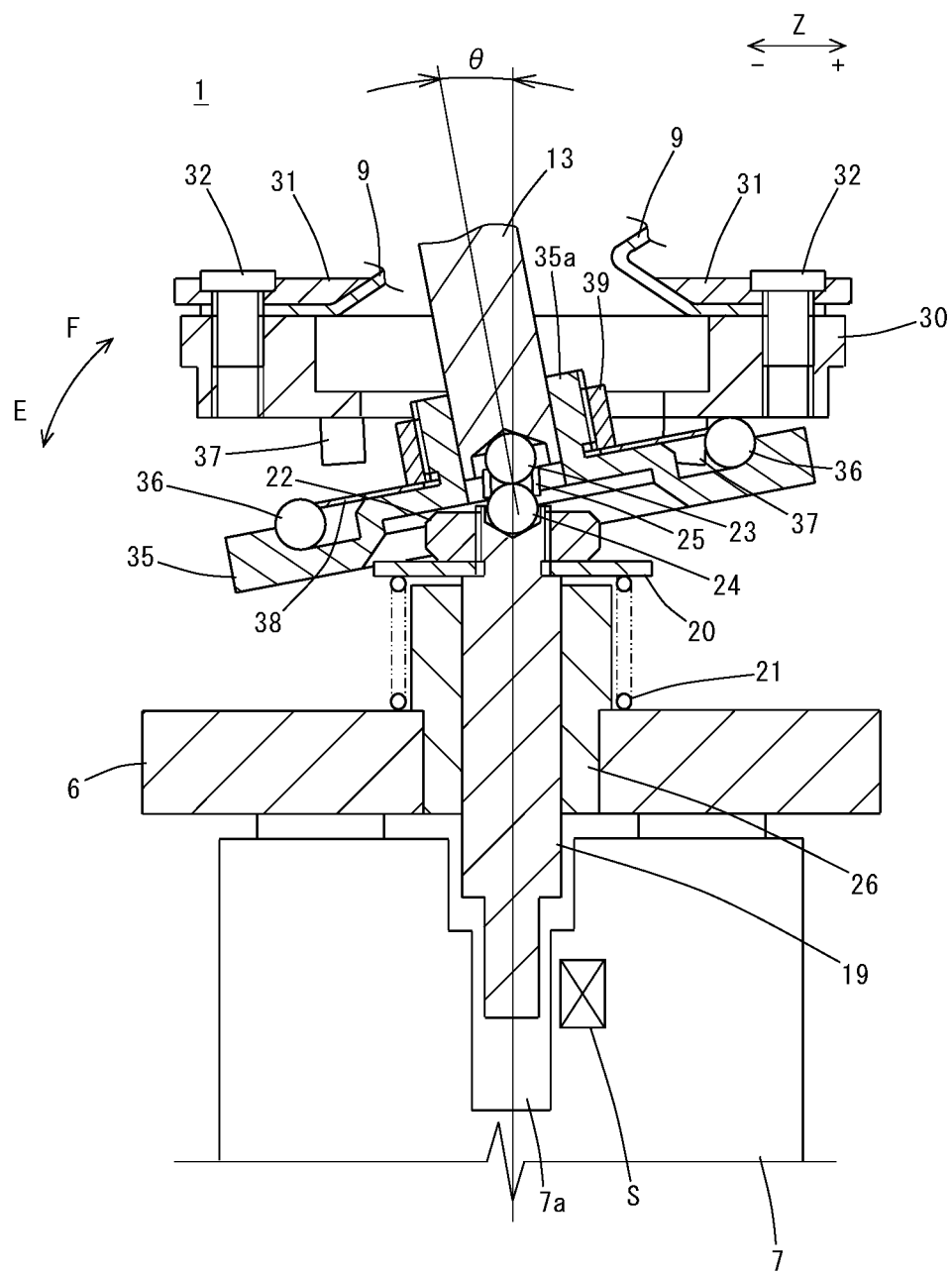
FIG. 5 is a diagram used to describe a manner of touching detection in the touching detection device according to the first embodiment.
Figure 6:
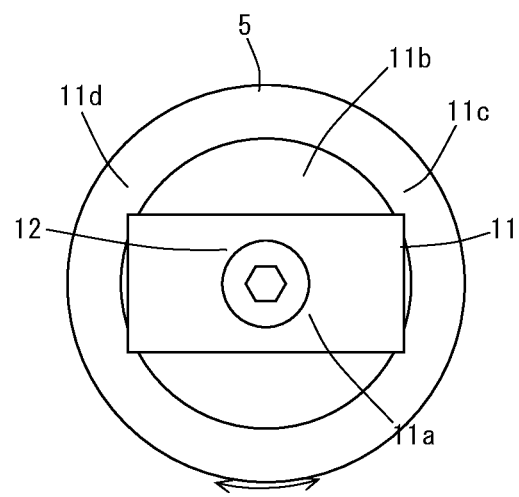
FIG. 6 is a diagram used to describe a manner of adjusting the angle of a touched body in the first embodiment.

First, an object to be detected (not illustrated) is moved in a direction perpendicular to the touch surfaces 11a and 11b, for example, in the −Z direction shown in FIG. 3, so that the object is pressed against the touch surface 11a of the touched body 11. Thereby, as shown in FIG. 5, the support shaft 13 supporting the touched body 11 as well as the swinging board 35 fixedly attached to the support shaft 13 are swung so that they are tilted in the E direction with respect to the reference pin 36 arranged perpendicularly to the moving direction of the object (not illustrated), i.e., the arrow Z direction, and positioned on the +Z side. This swing displaces the connection between the support shaft 13 and the sensed shaft 19, that is to say, the position of contact between the spheres 23 and 24, downward, so that the sensed shaft 19 is displaced downward along the axial direction thereof against the biasing force of the compressed coil spring 21. Consequently, the lower end of the sensed shaft 19 is sensed by the sensor S and the sensor S outputs a detection signal. Note that the tilt angle θ of the support shaft 13 at the time when the lower end of the sensed shaft 19 is sensed by the sensor S is hereinafter referred to as "detection angle θ".

After the touching of the object (not illustrated) is detected in the above-described manner, the object (not illustrated) is retracted in the +Z direction. Thereby, the support shaft 13 and the swinging board 35 are swung in the F direction by the biasing force of the compressed coil spring 21 so that they return to the original position.

Similarly, when an object to be detected (not illustrated) is moved in the +Z direction from the −Z side so that the object is pressed against the touch surface 11b of the touched body 11, the support shaft 13 and the swinging board 35 are swung in the F direction with respect to the reference pin 36 arranged perpendicularly to the arrow Z direction and positioned on the −Z side. This swing causes the sensed shaft 19 to be displaced downward along the axial direction thereof against the biasing force of the compressed coil spring 21. Consequently, the lower end of the sensed shaft 19 is sensed by the sensor S and the sensor S outputs a detection signal.

Further, also when an object to be detected (not illustrated) is moved in either one of two directions (−X direction and +X direction) perpendicular to the Z direction so that the object is pressed against the side surface 11c or 11d of the touched body 11, the support shaft 13 and the swinging board 35 are swung similarly to the above-described manner. Thereby, the sensed shaft 19 is displaced downward along the axial direction thereof; consequently, the lower end of the sensed shaft 19 is sensed by the sensor S and the sensor S outputs a detection signal.

3. Angle Adjustment in Angle Adjustment Mechanism

Next, angle adjustment in the angle adjustment mechanism 15 of the touching detection device 1 according to this embodiment is described.

Note that the joint 16 and the fork end 17 of the angle adjustment mechanism 15 have been adjusted so that they are arranged coaxially with each other as shown in FIG. 3.

Figure 7:
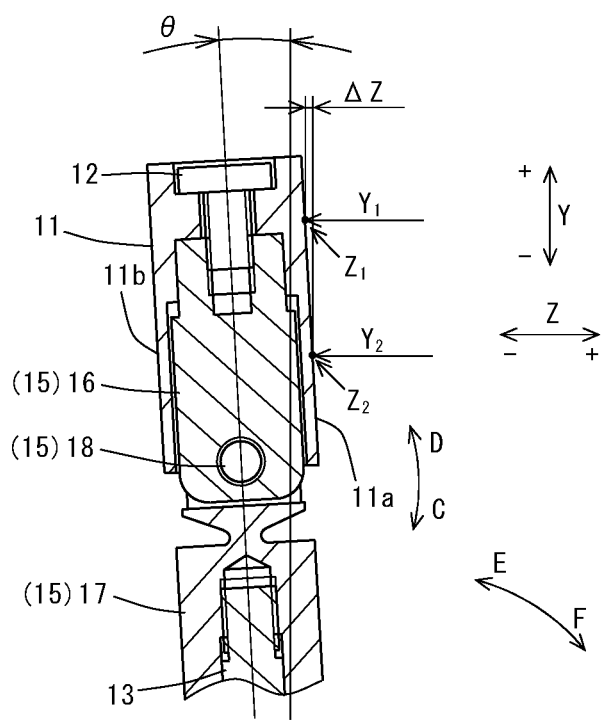
FIG. 7 is a diagram used to describe a manner of adjusting a support angle for the touched body by means of an angle adjustment mechanism according to the first embodiment.

First, the adjustment jig 50 is mounted onto the upper body 3 as shown in FIG. 1. Subsequently, the adjustment bolt 53 is tightened so that its distal end is pressed against the shaft portion of the fork end 17 and then the shaft portion of the fork end 17 is pushed further in the direction (−Z direction) perpendicular to the side surface 11a of the touched body 11. Thereby, the angle adjustment mechanism 15 and the support shaft 13 are tilted in the pushed direction (−Z direction) as shown in FIG. 7. While monitoring output of the sensor S, the support shaft 13 is further tilted by tightening the adjustment bolt 53 so that the sensed shaft 19 is displaced downward. When the lower end of the sensed shaft 19 is sensed by the sensor S and the sensor S outputs a detection signal, that is to say, when the tilt angle of the support shaft 13 reaches the detection angle θ, the tightening of the adjustment bolt 53 is stopped.

Figure 8:
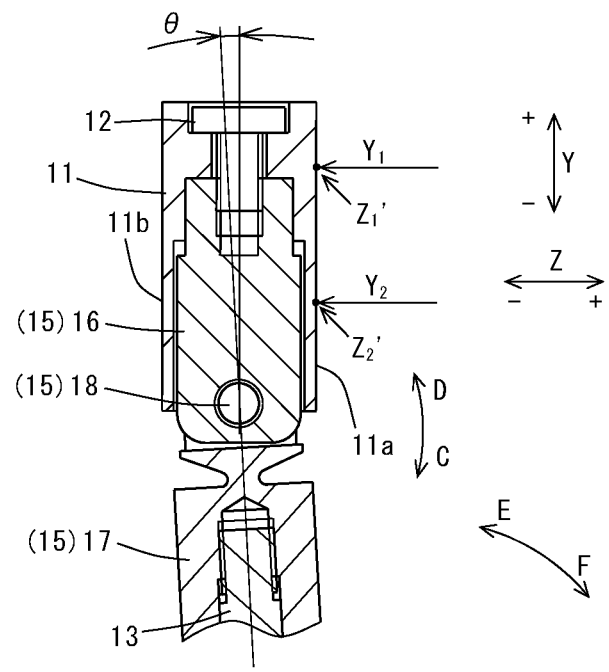
FIG. 8 is a diagram used to describe the manner of adjusting the support angle for the touched body by means of the angle adjustment mechanism according to the first embodiment.

Subsequently, the bolt 18 of the angle adjustment mechanism 15 is loosened, and then the angle of the touched body 11 is adjusted with a measurement device as appropriate so that the side surfaces 11a and 11b of the touched body 11 become vertical to the arrow Z direction as shown in FIG. 8. Thereafter, the bolt 18 is tightened. Thus, the angle of the touched body 11 in the arrow E-F direction that is the swinging direction of the support shaft 13 is adjusted. After the angle of the touched body 11 is adjusted in this manner, the adjustment jig 50 is detached from the upper body 3.

4. Manner of Touching Detection in Touching Detection Device According to This Embodiment In the touching detection device 1 according to this embodiment having the above-described configuration, the touching of an object to be detected (not illustrated) with the touched body 11 is detected in the manner described below. Note that the angle of the touched body 11 in the arrow E-F direction has previously been adjusted to the state shown in FIG. 9.

Figure 9:
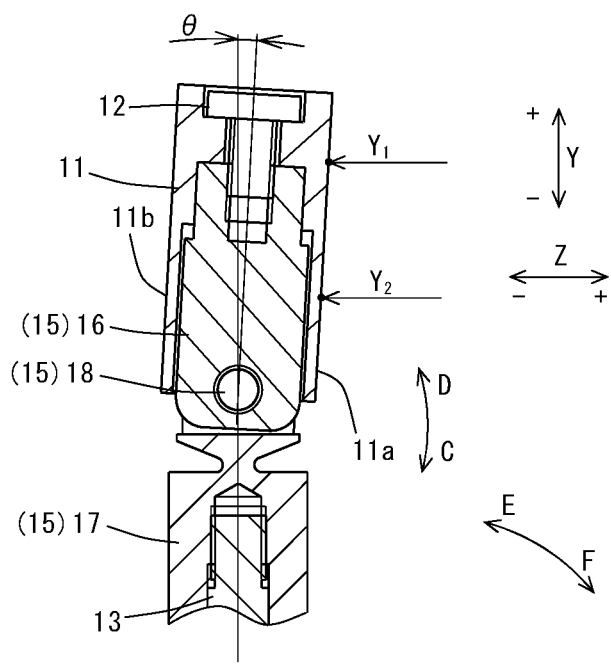
FIG. 9 is a diagram used to describe the manner of touching detection in the touching detection device according to the first embodiment.

For example, in a case where the touching detection device 1 is installed on a table of a machining center, which is a machine tool, to set an offset amount in a tool length direction, the touching detection device 1 in the state shown in FIG. 9 is first installed onto the table such that the arrow Z direction coincides with an axial direction of the tool. Subsequently, the tool that is attached to a spindle is moved manually in the −Z direction along the axis of the tool so that it is pressed against the side surface 11a of the touched body 11. In this process, the tool is first positioned manually in the vertical direction (the arrow Y direction perpendicular to the arrow Z direction) and then moved in the −Z direction so that it is pressed against the side surface 11a. Thereby, the support shaft 13 and the swinging board 35 are swung in the E direction and the sensed shaft 19 is displaced downward. When the lower end of the sensed shaft 19 is displaced to the sensed position, the lower end of the sensed shaft 19 is sensed by the sensor S and the sensor S outputs a detection signal. The position of the tool in the Z direction at the time when the sensor S outputs the detection signal is recognized by the machine tool.

In this process, as described above, the tool is positioned manually in the arrow Y direction. Therefore, when the touching detection is carried out with respect to two or more tools, manually positioning each tool in the arrow Y direction results in that the position at which each tool is positioned is not uniform but varies among the tools. For example, in the case of positioning two tools in the arrow Y direction, as shown in FIG. 9, the tools are positioned at different positions $Y_1$ and $Y_2$. If the angle of the touched body 11 in the arrow E-F direction is not adjusted to the state described in this embodiment, that is to say, if the joint 16 and the fork end 17 of the angle adjustment mechanism 15 are arranged coaxially with each other as shown in FIG. 7, in the case where tools are positioned at different positions $Y_1$ and $Y_2$ ($Y_1$>$Y_2$) in the arrow Y direction, the positions $Z_1$ and $Z_2$ of the tools in the Z direction at the time when the support shaft 13 is tilted to the detection angle θ are not equal in value and have the relation of $Z_1$<$Z_2$ as shown in FIG. 7. This causes an error of ΔZ (=$Z_2$−$Z_1$) to occur between the detected positions of the tools T in the Z direction.

In contrast, in the touching detection device 1 according to this embodiment, the angle of the touched body 11 in the arrow E-F direction is adjusted such that the side surface 11a as a touch surface of the touched body 11 is vertical to the Z direction in the state where the support shaft 13 is tilted to the detection angle θ. Therefore, as shown in FIG. 8, even in the case where tools are positioned at different positions $Y_1$ and $Y_2$ ($Y_1$>$Y_2$) in the Y direction, the positions $Z_1'$ and $Z_2'$ of the tools in the Z direction at the time when the support shaft 13 is tilted to the detection angle θ are equal in value. Therefore, in theory, there is no error in the detected position of each tool in the Z direction, except for errors relevant to operation of motion units of the machine tool and the like. Accordingly, a touching position of each tool in the Z direction is accurately and precisely detected. Therefore, when this touching detection device 1 is used to set tool length offset amounts in a machine tool, even in the case where the touched body 11 is designed to have a large side surface (touch surface) 11a so as to improve operational efficiency and the like, a touching position each tool in the Z direction is accurately and precisely detected, so that the tool offset amounts are accurately set.

Second Embodiment

Next, a touching detection device according to a second embodiment of the present invention is described with reference to FIGS. 10 and 11.

Figure 10:
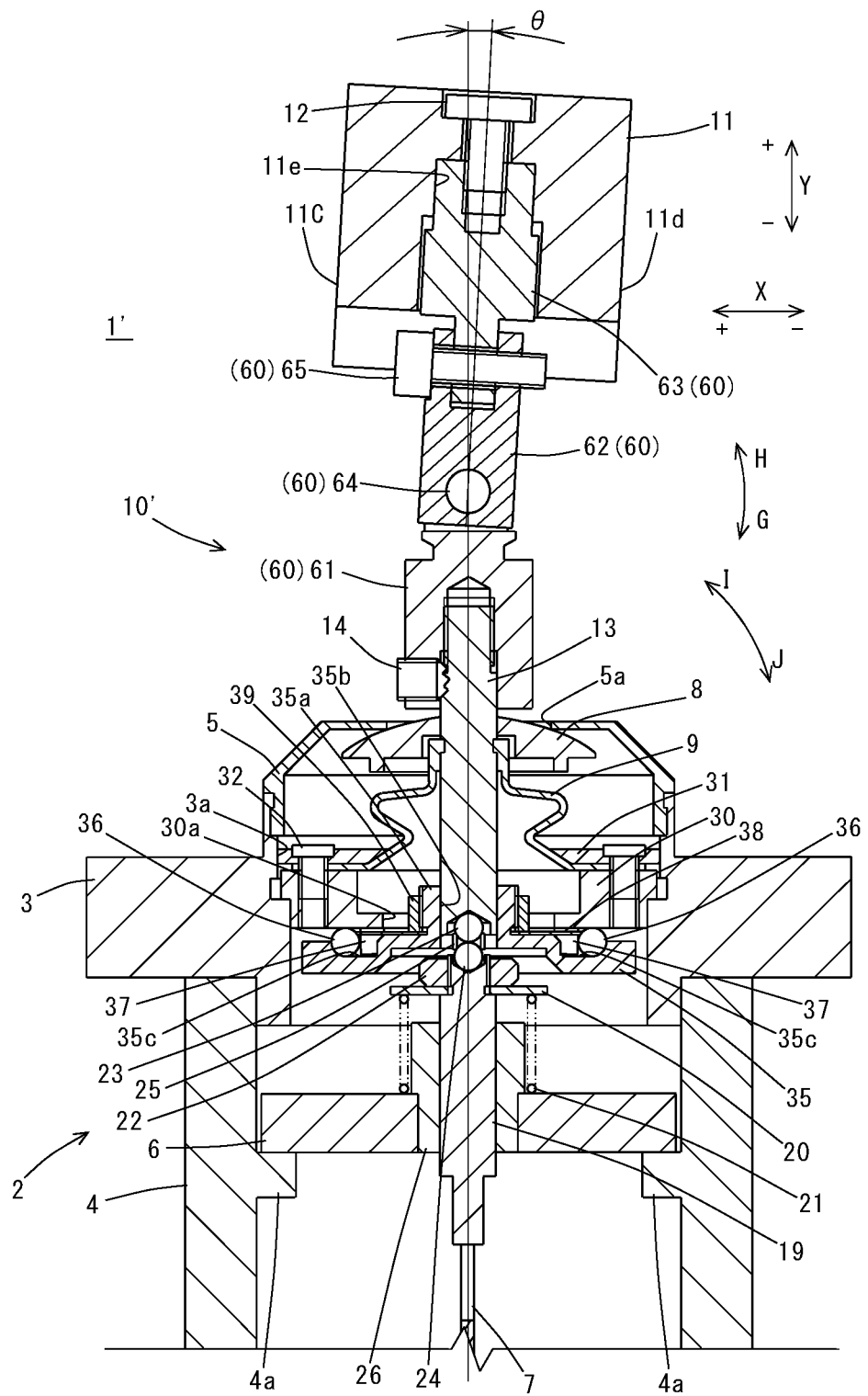
FIG. 10 is a sectional view similar to FIG. 2, but which illustrates a touching detection device according to a second embodiment of the present invention.
Figure 11:
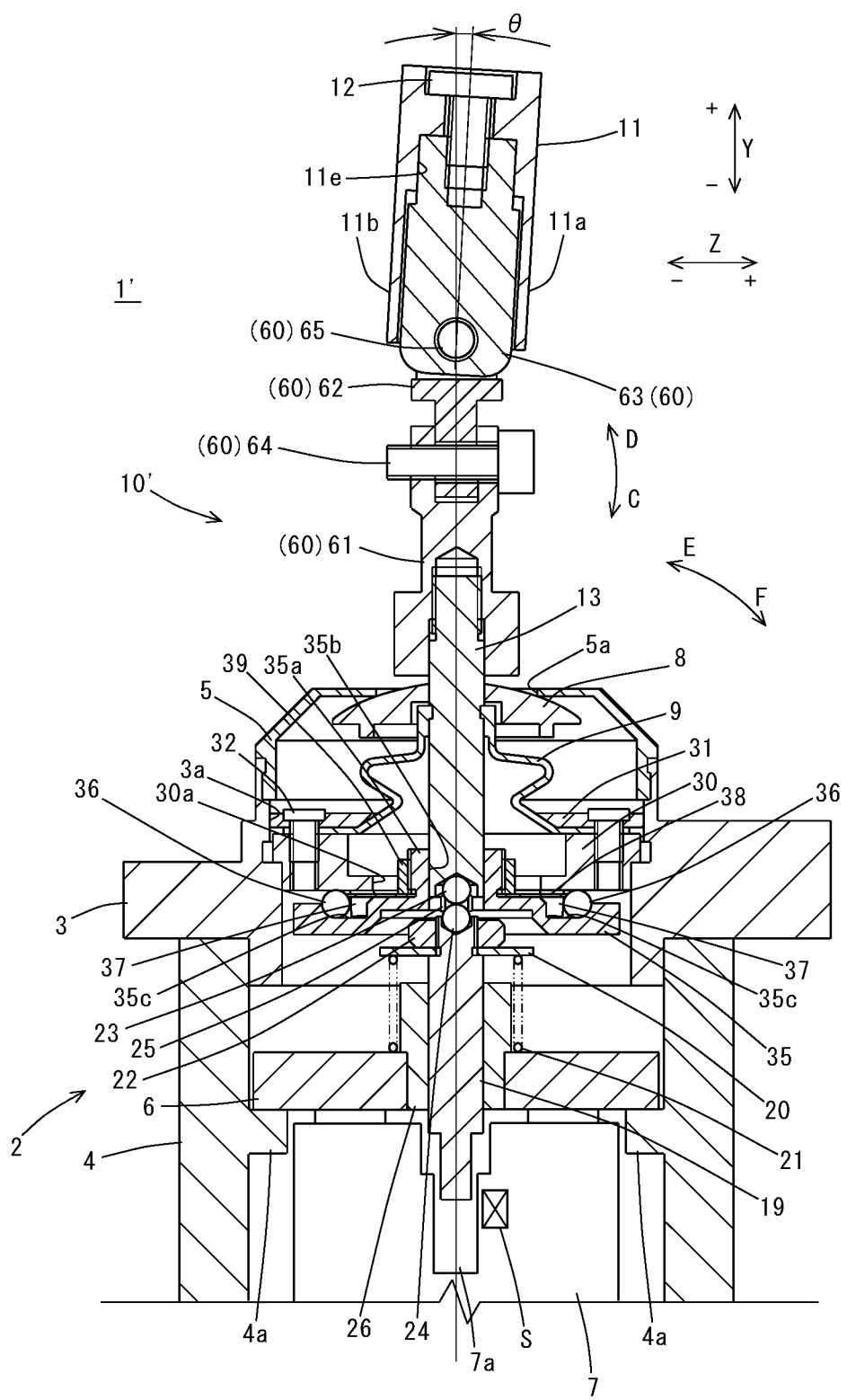
FIG. 11 is a sectional view similar to FIG. 3, but which illustrates the touching detection device according to the second embodiment of the present invention.

As illustrated in FIGS. 10 and 11, the touching detection device 1' according to the second embodiment is configured differently from the touching detection device 1 according to the first embodiment in that the touching detection device 1' includes an angle adjustment mechanism 60 instead of the angle adjustment mechanism 15. Accordingly, the same components as those of the touching detection device 1 are denoted by the same reference numerals and detailed description of such components is omitted in the description below. Note that reference numeral 10' denotes a probe having the angle adjustment mechanism 60.

In the touching detection device 1' according to the second embodiment, the touched body 11 is supported by the support shaft 13 via the angle adjustment mechanism 60. The angle adjustment mechanism 60 consists of a first fork end 61, a second fork end 62 coupled to the first fork end 61, a joint 63 coupled to the second fork end 62, a bolt 64 for tightening a fork portion of the first fork end 61, and a bolt 65 for tightening a fork portion of the second fork end 62. The joint 63 is inserted in the holding hole 11e of the touched body 11, and the joint 63 in this state is fastened to the touched body 11 by tightening of the bolt 12.

The first fork end 61 has a screw hole formed that has an opening in a lower surface of the first fork end 61, in which screw hole the upper end of the support shaft 13 is screwed. Loosening of the support shaft 13 screwed in the first fork end 61 is prevented by the set screw 14.

The first fork end 61 and the second fork end 62 are coupled to each other by tightening of the bolt 64 such that an axis of the second fork end 62 and the side surface 11d as a touch surface of the touched body 11 become vertical to the arrow X direction when the support shaft 13 is tilted by the detection angle θ in the I direction.

Further, the second fork end 62 and the joint 63 are coupled to each other by tightening of the bolt 65 such that the side surface (touch surface) 11a of the touched body 11 becomes vertical to the Z direction when the support shaft 13 is tilted by the detection angle θ in the E direction.

Thus, in the touching detection device 1' according to the second embodiment, similarly to the touching detection device 1 according to the first embodiment, the angle of the touched body 11 in the arrow E-F direction is adjusted such that the side surface 11a as a touch surface of the touched body 11 is vertical to the Z direction in the state where the support shaft 13 is tilted to the detection angle θ in the E direction. Therefore, as described above, for example, in the case of detecting touching positions of tools in the Z direction, the position (touching detection position) of each tool in the Z direction at the time when the support shaft 13 is tilted to the detection angle θ is equal in value even if the position in the Y-axis direction of the contact with the touch surface 11a of the touched body 11 varies among the tools; therefore, in theory, there is no error in the detected position of each tool in the Z direction, except for errors relevant to operation of motion units of the machine tool and the like.

Further, in the touching detection device 1' according to the second embodiment, the angle of the touched body 11 in the arrow G-H direction is adjusted such that the side surface 11d as a touch surface of the touched body 11 is vertical to the X direction in the state where the support shaft 13 is tilted to the detection angle θ in the I direction. Therefore, for example, in the case of detecting touching positions of tools in the X direction that is perpendicular to the Z direction and the Y direction, the position (touching detection position) of each tool in the X direction at the time when the support shaft 13 is tilted to the detection angle is equal in value even if the position in the Y direction of the contact with the touch surface 11d of the touched body 11 varies among the tools; therefore, in theory, there is no error in the detected position of each tool in the X direction, except for errors relevant to operation of the motion units of the machine tool and the like.

As described above, with this touching detection device 1', touching positions of an object to be detected such as a tool in two perpendicular directions, namely, in the Z direction and the X direction, are accurately and precisely detected. Therefore, when the touching detection device 1' is used in a machine tool to set offset amounts in a tool length direction (i.e., tool length compensation) and set tool diameter compensation amounts in a direction perpendicular to the tool length direction, touching positions of each tool in the Z direction and the X direction are accurately and precisely detected even in the case where the touched body 11 is designed to have large side surfaces 11a (touch surface), 11b, 11c, and 11d (touch surface) so as to improve operational efficiency. Therefore, the tool offset amounts are accurately set.

Third Embodiment

Next, a touching detection device according to a third embodiment of the present invention is described with reference to FIGS. 12 and 13.

Figure 12:
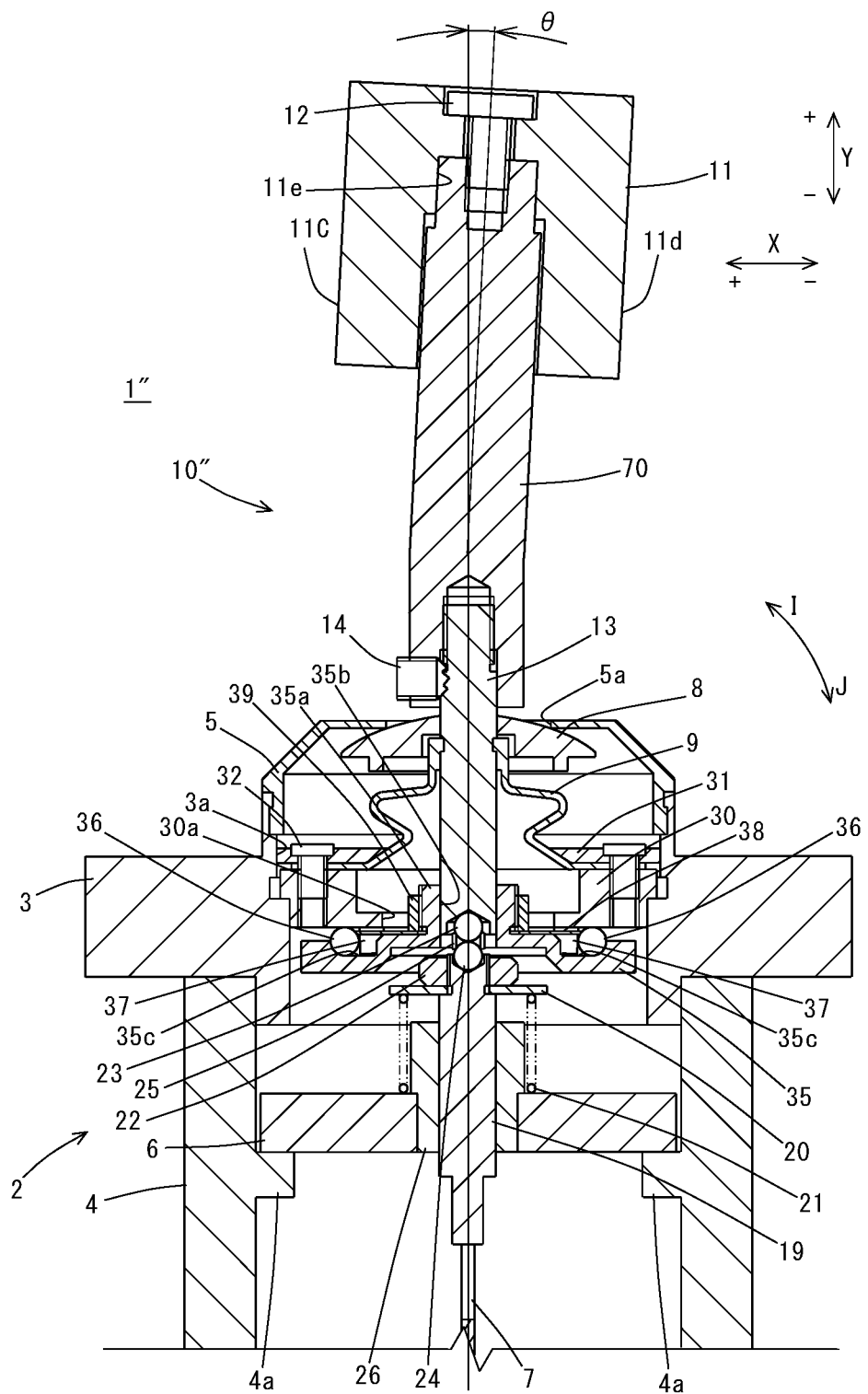
FIG. 12 is a sectional view similar to FIG. 2, but which illustrates a touching detection device according to a third embodiment of the present invention.
Figure 13:
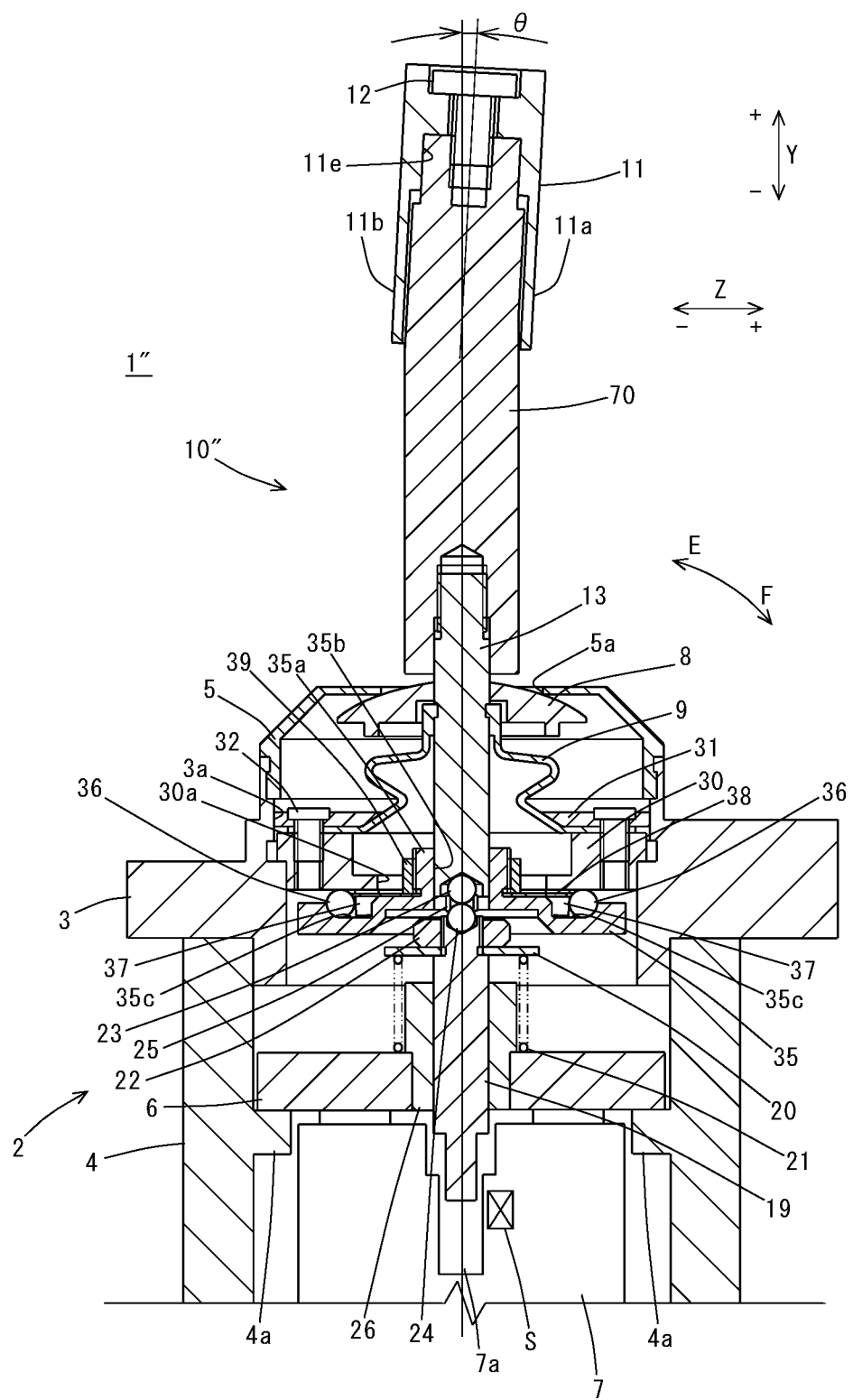
FIG. 13 is a sectional view similar to FIG. 3, but which illustrates the touching detection device according to the third embodiment of the present invention.

As illustrated in FIGS. 12 and 13, the touching detection device 1" according to the third embodiment is configured differently from the touching detection device 1' according to the second embodiment in that the touching detection device 1" includes an inclined shaft 70 as a support part instead of the angle adjustment mechanism 60. Accordingly, the same components as those of the touching detection devices 1 and 1' are denoted by the same reference numerals and detailed description of such components is omitted in the description below. Note that reference numeral 10" denotes a probe having the inclined shaft 70.

In the touching detection device 1" according to the third embodiment, the touched body 11 is supported by the support shaft 13 via the inclined shaft 70 that is coupled to the support shaft 13. As illustrated in FIG. 12, the axis of the inclined shaft 70 is bent such that the side surface 11d as a touch surface of the touched body 11 becomes vertical to the X direction when the support shaft 13 is tilted by the detection angle θ in the I direction.

Further, as illustrated in FIG. 13, the axis of the inclined shaft 70 is bent such that the side surface 11a as a touch surface of the touched body 11 becomes vertical to the Z direction when the support shaft 13 is tilted by the detection angle θ in the E direction.

Thus, similarly to the touching detection device 1' according to the second embodiment, the touching detection device 1" according to the third embodiment is configured such that the side surface 11a as a touch surface of the touched body 11 is vertical to the Z direction in the state where the support shaft 13 is tilted to the detection angle in the E direction. Therefore, as described above, for example, in the case of detecting touching positions of tools in the Z direction, the position (touching detection position) of each tool in the Z direction when the support shaft 13 is tilted to the detection angle is equal in value even if the position in the Y direction of the contact with the touch surface 11a of the touched body 11 varies among the tools; therefore, in theory, there is no error in the detected position of each tool in the Z direction, except for errors relevant to operation of motion units of the machine tool and the like.

The touching detection device 1" according to the third embodiment is further configured such that the side surface 11d as a touch surface of the touched body 11 becomes vertical to the X direction when the support shaft 13 is tilted to the detection angle θ in the I direction. Therefore, for example, in the case of detecting touching positions of tools in the X direction that is perpendicular to the Z direction and the Y direction, the position (touching detection position) of each tool in the X direction when the support shaft 13 is tilted to the detection angle is equal in value even if the position in the Y direction of the contact with the touch surface 11d of the touched body 11 varies among the tools; therefore, in theory, there is no error in the detected position of each tool in the X direction, except for errors relevant to operation of the motion units of the machine tool and the like.

As described above, with this touching detection device 1", touching positions of an object to be detected such as a tool in two perpendicular directions, namely, in the Z direction and the X direction, are accurately and precisely detected. Therefore, when the touching detection device 1" is used in a machine tool to set tool offset amounts, touching positions of each tool in the Z direction and the X direction are accurately and precisely detected even in the case where the touched body 11 is designed to have large side surfaces 11a (touch surface), 11b, 11c, and 11d (touch surface) so as to improve operational efficiency. Therefore, the tool offset amounts are accurately set.

Hereinbefore, specific embodiments of the present invention have been described. However, the foregoing description of the embodiments is not limitative, but illustrative in all aspects. One skilled in the art would be able to make variations and modifications as appropriate. The scope of the present invention is not defined by the above-described embodiments, but is defined by the appended claims. Further, the scope of the present invention encompasses all modifications made within the scope equivalent to the scope of the claims.

REFERENCE SIGNS LIST

1 Touching detection device
2 Body
10 Probe
11 Touched body
13 Support shaft
15 Angle adjustment mechanism
19 Sensed shaft
50 Adjustment jig
S Sensor

The invention claimed is:

1. A touching detection device comprising:
a probe having a touched part, a support part supporting the touched part, and a sensed part, the touched part having a touch surface to be touched by an object to be detected;
a sensor sensing the sensed part of the probe; and
a body holding the probe and the sensor,
wherein:
the support part is held by the body to be swingable in a direction in which the object to be detected touches the touch surface of the touched part;
the sensed part is configured to be displaced in accordance with an amount of swing of the support part;
the sensor is configured to, when the sensed part is displaced by a preset displacement amount, sense the sensed part and output a detection signal;
the support part is configured to support the touched part via an angle adjustment mechanism configured to be able to adjust an angle of the touch surface in a swinging direction of the support part;
the touched part has two touch surfaces to be touched by the object to be detected, the touch surfaces being perpendicular to each other;
both the touch surfaces are flat;
the support part is held by the body to be swingable in each of two directions in which the object to be detected touches each of the touch surfaces of the touched part;
the sensed part is configured to be displaced in accordance with an amount of swing of the support part in each of the two directions;
the sensor is configured to, when the sensed part is displaced by a preset displacement amount in accordance with the amount of swing of the support part in each of the two directions, sense the sensed part and output a detection signal; and
the angle adjustment mechanism is configured to be able to adjust an angle of each of the touch surfaces in a corresponding swinging direction of the support part.
2. The touching detection device of claim 1, further comprising an adjustment jig detachably attached to the body to tilt the support part in the swinging direction of the support part.

3. A touching detection device comprising:
a probe having a touched part, a support part integrally coupled to the touched part, and a sensed part, the touched part having a touch surface to be touched by an object to be detected;
a sensor sensing the sensed part of the probe; and
a body holding the probe and the sensor,
wherein:
the support part is held by the body to be swingable in a direction in which the object to be detected touches the touch surface of the touched part;
the sensed part is configured to be displaced in accordance with an amount of swing of the support part;
the sensor is configured to, when the sensed part is displaced by a preset displacement amount, sense the sensed part and output a detection signal;
the touched part is coupled to the support part such that, when the support part is swung to an angle at which the sensor outputs the detection signal, the touch surface of the touched part is perpendicular to a touching direction of the object to be detected; and
the touch surface is flat and inclined to both the touching direction and a direction that is perpendicular to the touching direction before the support part is swung to the angle at which the sensor outputs the detection signal.

4. The touching detection device of claim 3, wherein:
the touched part has two touch surfaces to be touched by the object to be detected, the touch surfaces being perpendicular to each other;
the support part is held by the body to be swingable in each of two directions in which the object to be detected touches each of the touch surfaces of the touched part;
the sensed part is configured to be displaced in accordance with an amount of swing of the support part in each of the two directions;
the sensor is configured to, when the sensed part is displaced by a preset displacement amount in accordance with the amount of swing of the support part in each of the two directions, sense the sensed part and output a detection signal; and
the touched part is coupled to the support part such that, when the support part is swung, in each of two swinging directions, to an angle at which the sensor outputs the detection signal, a corresponding touch surface of the touched part is perpendicular to a touching direction of the object to be detected.

* * * * *